No. 792,461. PATENTED JUNE 13, 1905.
C. SAHM.
MIXING APPARATUS.
APPLICATION FILED JUNE 6, 1904.
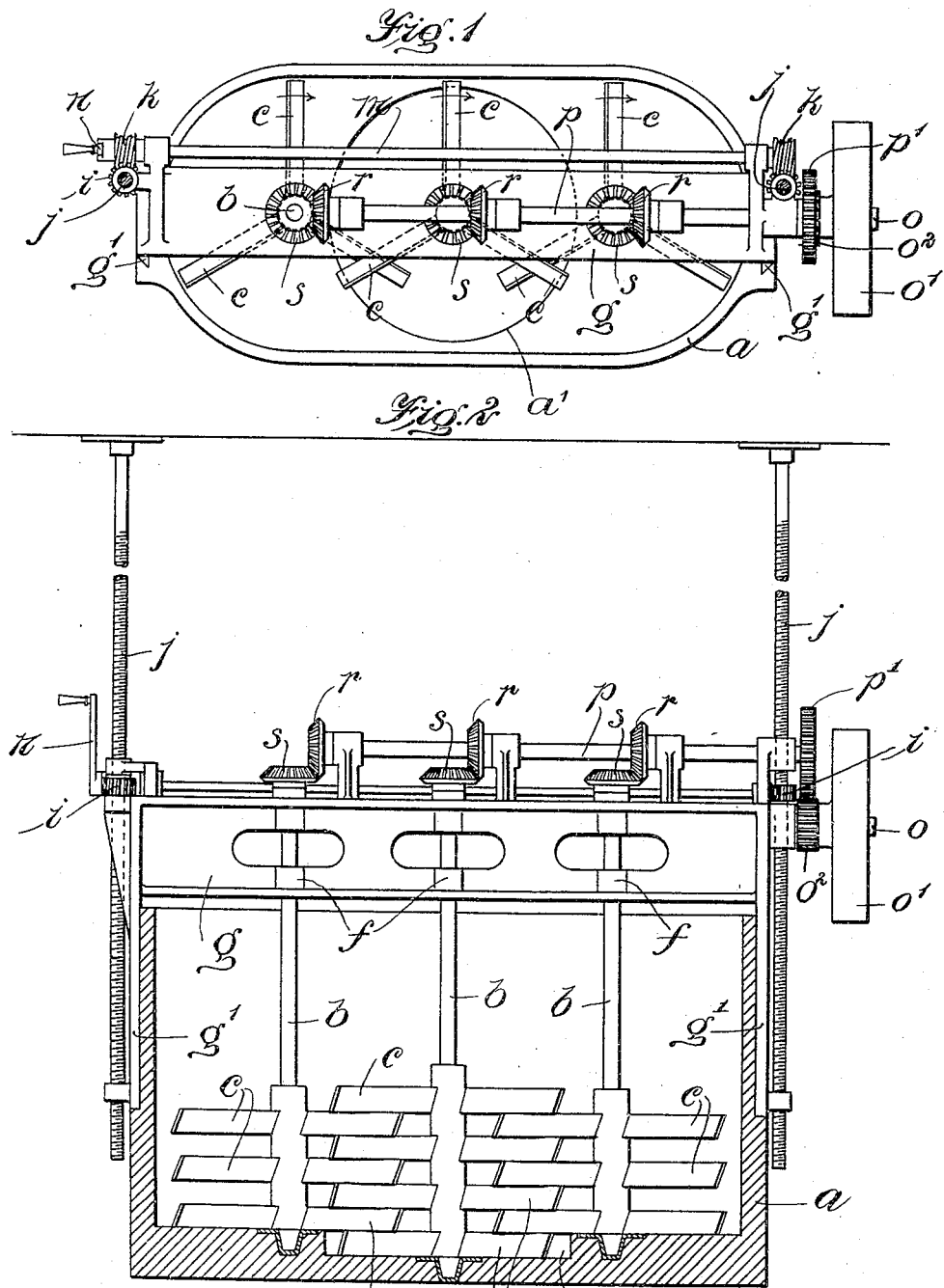

No. 792,461.

Patented June 13, 1905.

UNITED STATES PATENT OFFICE.

CARL SAHM, OF LYNN, MASSACHUSETTS.

MIXING APPARATUS.

SPECIFICATION forming part of Letters Patent No. 792,461, dated June 13, 1905.

Application filed June 6, 1904. Serial No. 211,255.

*To all whom it may concern:*

Be it known that I, CARL SAHM, of Lynn, in the county of Essex and State of Massachusetts, have invented certain new and useful Improvements in Mixing Apparatus, of which the following is a specification.

This invention has for its object to provide a machine for quickly and thoroughly mixing the component parts of a mass of dough to prepare the same for baking; and it consists in the improvements which I will now proceed to describe and claim.

Of the accompanying drawings, forming a part of this specification, Figure 1 represents a top plan view of a dough-mixing machine embodying my invention. Fig. 2 represents a sectional elevation of the same.

The same letters of reference indicate the same parts in both of the figures.

In the drawings, $a$ represents a receptacle having a substantially flat bottom and semicircular ends, said receptacle being adapted to hold a mass of dough.

$b\ b$ represent a series of vertical shafts which are located in the receptacle $a$ and are simultaneously rotated by suitable means, as hereinafter described, the shafts being all rotated in the same direction. Each shaft is provided with a series of groups of horizontally-arranged blades or cutters $c$, preferably three in number. In other words, each group preferably contains three blades, all radiating from a hub $c'$, affixed to a shaft $b$. The upper and lower edges of each blade are formed as cutting or shearing edges, and the upper edges of the blades on one shaft are arranged in substantially the same plane as the lower edges of the blades on the next shaft, as shown in Fig. 2, so that when said edges meet and cross each other they coöperate in cutting or shearing through a mass of dough between the two shafts. In order that the edges of the blades may coöperate, as described, so as to have a shearing contact with each other, the said edges are perpendicular to their axes of rotation. In other words, the blades project from the shafts at a right angle to the said shafts. It will be seen that inasmuch as each shaft has a number of groups of blades and that as a number of shafts are employed there is a relatively large number of coöperating pairs of shear-blades, each acting to cut through a part of the mass of dough. The result is that the dough is thoroughly and effectively stirred and its parts thoroughly mixed. Each cutter is preferably inclined in cross-section, the arrangement being such that its lower edge is in advance of its upper edge, so that each cutter has a tendency to lift the mass of dough from the bottom of the receptacle.

It will be seen that the cutting or shearing action of the cutters while they are stirring or mixing the dough enables the operation to be performed with the minimum expenditure of power, the cutters sliding through the dough with a motion which is rendered relatively free from resistance both by the cutting action of the cutters and by their inclination.

To prevent the formation of a space at the central portion of the receptacle $a$, in which dough can accumulate without being acted on by the cutters, I provide said central portion with a circular depression $a'$, which receives the lower group of cutters on the central shaft $b$. The lower cutters of the other shafts are in close proximity to the portion of the bottom of the receptacle surrounding the recess $a'$. Hence practically all parts of the bottom of the receptacle are reached by the cutters.

The shafts $b$ are preferably journaled in bearings $f$, formed on a head $g$, located over the receptacle $a$, said head having downwardly-projecting dovetailed ears $g'$, adapted to engage dovetailed sockets in the ends of the receptacle $a$ to hold the parts accurately in proper relative positions when the head is lowered to the position shown in Fig. 2. The head $g$ is preferably vertically movable to raise the shafts and cutters from the receptacle and restore the same to the receptacle. To this end the head $g$ may be provided with nuts $i\ i$, adapted to rotate on the head and engage the fixed screw-threaded rods $j$, which may be secured to any fixed support above the head, such as a beam at the top of the room. The nuts $i\ i$ are formed externally as worm-gears and are engaged with worms $k\ k$, affixed to a shaft $m$, which is journaled in bearings on the head $g$ and provided with a crank $n$ or other means for imparting rotation to the shaft $m$, thus causing the worms $k$ to rotate the nuts $i$ $i$ and raise or lower the head $g$.

Means are provided on the head for simultaneously rotating the shafts $b$. Said means may comprise a driving-shaft $o$, having a pulley $o'$ to engage a driving-belt and a gear $o^2$ and shaft $p$, journaled in bearings on the head $g$, and provided with a gear $p'$, meshing with a gear $o^2$, and beveled gears $r$ $r$ $r$, affixed to the shaft $p$ and meshing with beveled gears $s$ $s$ $s$, affixed to the upper ends of the shafts $b$.

It will be seen from the foregoing that the receptacle $a$ may be mounted on any suitable support, whether fixed or movable, and that the shafts $b$ and their cutters may be raised and lowered into the receptacle by movements of the head $g$ relatively to the fixed overhead support. I do not limit myself to the described mechanism for moving the head $g$ and for rotating the shafts $b$, as any other suitable mechanism may be employed for these purposes.

An important feature of my invention is the separability of the head and the mixing mechanism carried thereby, constituting one part of the apparatus, from the receptacle constituting the other part of the apparatus. This separability enables a number of receptacles to be used interchangeably with each head. In practice each receptacle is provided with suitable quantities of flour, water, &c., to make a batch of dough and is then applied to the head. After the said materials have been mixed into dough the receptacle is removed from the head and set aside until the dough rises, and during this period other receptacles may be used in the same manner. This is due to the fact that the head and the mechanism, including the cutting-blades, carried thereby are supported entirely by the overhead means, so that said head and the parts carried thereby can be raised entirely above the plane of the top of the receptacle, thus leaving the receptacle free to be moved laterally in any direction, so that one receptacle can be removed and another moved under the head. When the new receptacle is placed under the head, it will be so set that the dovetailed ears $g'$ of the head when the head is lowered will engage the dovetailed sockets in the ends of the receptacle, thereby firmly securing the parts of the apparatus in their proper relative positions.

I claim—

1. A mixing apparatus comprising a receptacle, a series of rotary shafts therein, each having cutting-blades, the edges of said blades being perpendicular to their axes of rotation, the blades of each shaft being formed and arranged to have a shearing contact with the blades of the next shaft.

2. A mixing apparatus comprising a receptacle, a series of rotary shafts therein, each having blades which are inclined in cross-section and are arranged to exert an upward or lifting pressure on a mass of material through which they pass, the edges of said blades being perpendicular to their axes of rotation, the blades of each shaft being adapted to have a shearing contact with the blades of the next shaft in cutting or shearing through a mass of material between the shafts.

3. A mixing apparatus comprising a receptacle, a series of rotary shafts therein each having cutting or shearing blades, the upper edges of the blades of one shaft being in substantially the same plane as the lower edges of the blades of the next shaft and the said edges being perpendicular to the axes of rotation of the shafts, whereby the blades are caused to coöperate in pairs as shear-blades to cut or shear masses of material between the shafts, the bottom of the receptacle having a depression for receiving some of the cutters.

4. A mixing apparatus comprising a receptacle, a head located above the receptacle and overhead supports for said head, means whereby said head may be moved vertically toward and from the receptacle, a series of downwardly-extending shafts journaled in the head and provided with mixing devices, and means carried by the head to rotate said shafts, said head having downwardly-projecting ears, and the receptacle having sockets to receive said ears, the said ears being separable from said sockets when the head is elevated to permit the space below the head to be left entirely unobstructed.

5. A mixing apparatus comprising two general parts, viz., first, a head and mixing mechanism supported thereby, and, secondly, a receptacle formed to receive the mixing mechanism and the materials to be mixed, one of said parts being movable toward and from the other to permit removal of the receptacle and the mixture therein from the mixing mechanism, the said head having downwardly-projecting ears, and the receptacle having sockets to receive said ears, the said ears being separable from said sockets when the head is elevated to permit the space below the head to be left entirely unobstructed.

In testimony whereof I have affixed my signature in presence of two witnesses.

CARL SAHM.

Witnesses:
SABINA W. McDERMOTT,
WILLIAM J. BARRY.